No. 755,707. PATENTED MAR. 29, 1904.
C. G. A. SCHMIDT, Jr.
DRIVE CHAIN.
APPLICATION FILED NOV. 27, 1903.
NO MODEL.
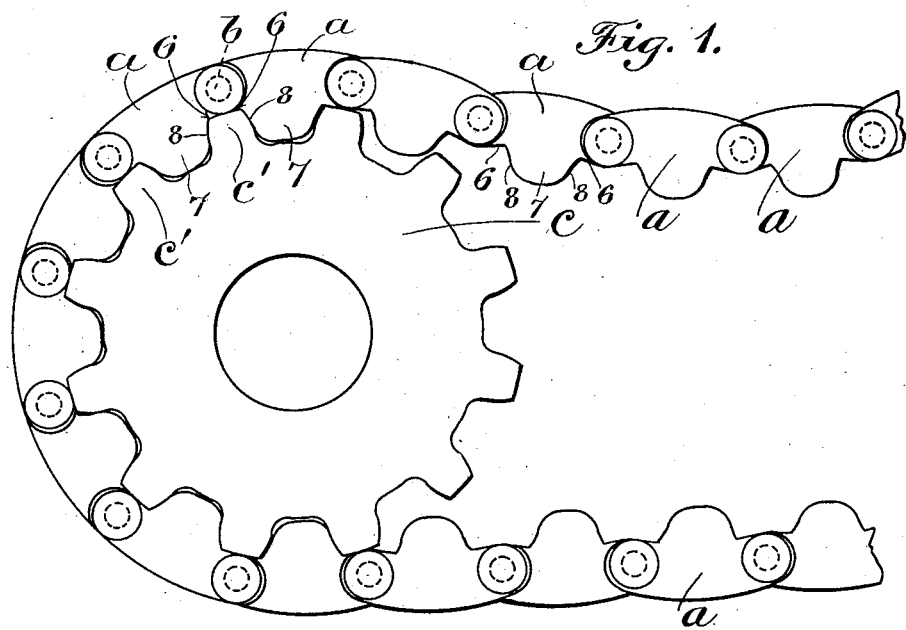
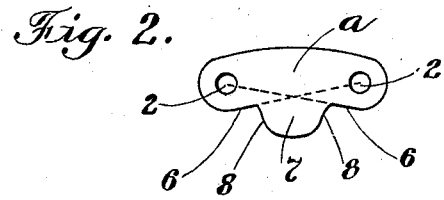
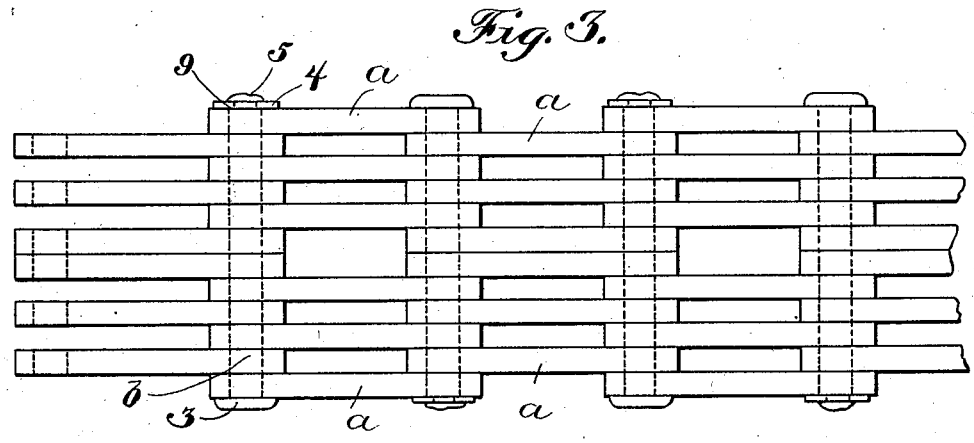
Witnesses:
P. W. Pezzetti
E. Batchelder
Inventor:
Carl G. A. Schmidt Jr
by Wright Brown & Quinby
Attys.

No. 755,707. Patented March 29, 1904.

UNITED STATES PATENT OFFICE.

CARL G. A. SCHMIDT, JR., OF COLUMBUS, OHIO.

DRIVE-CHAIN.

SPECIFICATION forming part of Letters Patent No. 755,707, dated March 29, 1904.

Application filed November 27, 1903. Serial No. 182,724. (No model.)

*To all whom it may concern:*

Be it known that I, CARL G. A. SCHMIDT, Jr., of Columbus, in the county of Franklin and State of Ohio, have invented certain new and useful Improvements in Drive-Chains, of which the following is a specification.

This invention relates to sprocket-chains composed of jointed links, which are formed to engage teeth of sprocket-wheels and impart motion from a driving-wheel to a driven wheel.

The invention has for its chief object to provide a simple, strong, and durable drive-chain adapted for either low or high speed driving, which shall be free from liability to stretch under the strains exerted on the chain and in which the tooth-engaging faces of the chain shall be formed to closely fit and firmly grasp the teeth of the sprocket-wheels, so that the links will have no tendency to slip from the teeth of the wheels.

The invention consists in the improved construction which I will now proceed to describe and claim.

Of the accompanying drawings, forming a part of this specification, Figure 1 represents a side view showing a portion of a complete chain embodying my invention engaged with a driving sprocket-wheel. Fig. 2 represents a side elevation of one of the links of the chain. Fig. 3 represents a back view of a portion of the chain.

The same reference characters indicate the same parts in all the figures.

In the drawings, $a$ $a$ represent the links of my improved chain, each link being preferably a flat blank of steel having orifices 2 2 in its end portions for the reception of transverse pins $b$, which pivotally connect the overlapping ends of the links. I prefer to make the chain of transverse rows of links, as shown in Fig. 3, the perforated ends of the links in one transverse row alternating with the perforated ends of the links in the next transverse row. The pins $b$ are engaged with the links by means of heads 3, formed on the pins, and washers 4, secured to the opposite ends of the pins by the upset ends 5 of the latter. Each link is provided at the end portions of its inner edge with two faces 6 6, which are substantially straight and obliquely arranged—that is to say, the line of each face if extended inwardly toward the opposite end of the link preferably intersects the orifice 2 in the opposite end of the link, as indicated by dotted lines in Fig. 2. This form and disposition of the faces 6 6 causes the faces of two adjacent links in a portion of the chain which is curved on a sprocket-wheel $c$ to conform to the outer end of a tooth $c'$ of the sprocket-wheel. Each link is provided at its inner edge with a projection 7, which is located between the faces 6 6 and is offset from the body portion of the link—namely, the portion intervening between the orifices 2 2. The said projection is provided with end faces or shoulders 8 8, which are so disposed and formed that in the said curved portion of the chain the opposed shoulders 8 on two adjacent projections conform closely to the sides of a wheel-tooth $c'$, as indicated in Fig. 1, the sides of said tooth being of the usual form.

It will be seen that the portion of the chain which is engaged with a sprocket-wheel accurately fits the teeth of the wheel, so that the chain has a firm and effective engagement with the wheel. The oblique faces 6 of the links conforming closely to the outer ends of the teeth $c'$ enable the links to be made of minimum width from their inner to their outer edges, the pins $b$ being in close proximity to the outer ends of the gear-teeth. The end faces or shoulders 8 8 are enabled by the oblique faces 6 6 to bear effectively on the sides of the teeth $c'$, the entire length of each face or shoulder 8 being utilized as a tooth-engaging face or surface. Hence the width of the projection 7 may be reduced to the minimum without sacrificing the effectiveness of the engagement between the chain and the wheel. It will be observed that the wheel-tooth-engaging projection 7 is at one side of the body of the link and between the ends of the link, so that the full strength of said body is preserved. Hence there is no liability of the link being extended by bending when the chain is in operation, as would be the case if each link were provided with two teeth located at its end portions. The described arrangement of the end faces or shoulders 8 8 in the acting portion of the chain is particularly useful in cases where the chain is somewhat loose, the said arrangement causing the chain to firmly grip the teeth $c'$.

Each pin $b$ is reduced in diameter at the end that engages the washer 4 to provide a shoulder 9, bearing on the inner side of the washer. Said shoulder prevents the links from being jammed or crowded together between the head 3 and washer 4.

I claim—

A sprocket-chain comprising flat links having end portions which are pivotally connected by transverse pins, each link having oblique faces at the end portions of its inner edge, disposed so that in a portion of the chain which is curved on a sprocket-wheel, two of said faces on adjacent links conform to the outer end of a tooth of said wheel, each link having also a projection on its inner edge, located between the said oblique faces, said projection having end faces or shoulders, which are so disposed that in the said curved portion of the chain, the opposed shoulders on two adjacent projections have an extended bearing on the sides of a tooth of the wheel.

In testimony whereof I have affixed my signature in presence of two witnesses.

CARL G. A. SCHMIDT, Jr.

Witnesses:
CHAS. M. SNIDER,
J. M. FURNAS.